(12) United States Patent
Fong et al.

(10) Patent No.: US 6,364,513 B1
(45) Date of Patent: Apr. 2, 2002

(54) LIGHTING DEVICE FOR MOTOR VEHICLES

(75) Inventors: Ching Fong, Troy; Jim Murphy, Oxford, both of MI (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 09/649,112

(22) Filed: Aug. 28, 2000

(51) Int. Cl.[7] .................................................. B60Q 1/00
(52) U.S. Cl. .................. 362/496; 362/505; 362/506; 362/518; 362/540; 362/541; 362/307
(58) Field of Search ................................ 362/496, 505, 362/506, 518, 540, 541, 307

(56) References Cited

U.S. PATENT DOCUMENTS 3,710,095 A * 1/1973 Donohue et al. ......... 240/41.36
4,740,871 A * 4/1988 Dilouya ...................... 362/80

* cited by examiner

Primary Examiner—Sandra O'Shea
Assistant Examiner—Ali Alavi
(74) Attorney, Agent, or Firm—Grossman, Tucker, Perreault & Pfleger, PLLC

(57) ABSTRACT

A motor vehicle lighting device is provided comprising a ground illumination portion configured to direct a portion of the light emitted from a light source to illuminate a ground surface area rearward from the motor vehicle and a reverse signaling portion configured to direct a portion of the light emitted from the light source to an area different than the ground illumination portion. In this manner, a rearward vehicle lighting device designed for ground illumination and reverse signaling is provided from a single lamp and more preferably, using a single light source.

5 Claims, 4 Drawing Sheets

LIGHTING DEVICE FOR MOTOR VEHICLES

TECHNICAL FIELD OF THE INVENTION

This invention relates generally to a lighting device for motor vehicles and, more particularly, a rearward lighting device.

BACKGROUND OF THE INVENTION

When driving a motor vehicle rearward with little or without any ambient illumination, the only vehicle lighting rearward of the motor vehicle is generally provided by the reverse signaling lamps. Unfortunately, conventional reverse signaling lamps are not designed to illuminate the ground, and indeed often do not provide satisfactory lighting for safe rearward driving. In recognizing the problem, certain vehicle manufacturers have taken measures to provide additional ground illumination rearward of the vehicle. In particular, General Motors has incorporated separate reverse signaling lamps and ground illumination lamps on the 1999 Pontiac Grand Am. However, separate reverse signaling and ground illumination lamps are cost prohibitive, and raise engineering and styling issues, as additional lamps must now be incorporated onto the vehicle.

Also, generally directly to the rear of any motor vehicle there exists a blind spot. In other words, an area where the operator is precluded from having sight. Any light to the rear of the vehicle applied to this area is of little or no benefit to the operator. Conventional reverse signaling lamps typically project light into this area. Depending on the vehicle, the size of the blind spot can substantially change. For example, for a small car with a very short vehicle length rearward of the operator the length of the blind spot may be 1–2 meters. However, for other vehicles such as a large pick-up truck for example, the blind spot may be up to 10 meters.

What is needed is rearward vehicle lighting device designed for ground illumination and reverse signaling from a single lamp, and preferably a single light source. What is also needed is ground illumination provided in a target area rearward of the vehicle which can be seen by the vehicle operator.

SUMMARY OF THE INVENTION

A motor vehicle lighting device is provided comprising a ground illumination portion configured to direct a portion of the light emitted from a light source to illuminate a ground surface area rearward from the motor vehicle and a reverse signaling portion configured to direct a portion of the light emitted from the light source to an area different than the ground illumination portion. In this manner, a rearward vehicle lighting device designed for ground illumination and reverse signaling is provided from a single lamp and more preferably, using a single light source.

According to another aspect of the invention, the housing comprises the ground illumination portion and the reverse signaling portion of the motor vehicle lighting device.

According to another aspect of the invention, the ground illumination portion comprises a housing first reflective surface and the reverse signaling portion comprises a housing second reflective surface with a different contour from the housing first reflective surface.

According to another aspect of the invention, a lens comprises the ground illumination portion and the reverse signaling portion of the motor vehicle lighting device.

According to another aspect of the invention, the motor vehicle lighting device has a luminous intensity at a ground surface and the maximum luminous intensity at the ground surface occurs at a location within the eyesight, either direct or indirect (e.g. reflected), of a vehicle operator.

According to another aspect of the invention, the portion of the light emitted from the lighting device to illuminate a ground surface area rearward from a motor vehicle is further configured to illuminate beginning at least one meter rearward from the vehicle and ending at a distance rearward from the vehicle about equal to the length of the vehicle.

According to another aspect of the invention, the portion of the light emitted from the lighting device to illuminate a ground surface area rearward from a motor vehicle is further configured to illuminate sidewards from the vehicle.

According to another aspect of the invention, the portion of the light emitted from the lighting device to illuminate a ground surface area sideward from a motor vehicle is further configured to illuminate sideward from the vehicle about one-half the width of the vehicle.

According to another aspect of the invention, the portion of the light emitted from the lighting device to illuminate a ground surface area rearward from a motor vehicle is further configured to illuminate a location within the eyesight, either direct or indirect (e.g. reflected), of a vehicle operator.

BRIEF DESCRIPTION OF THE DRAWINGS

To better understand and appreciate the invention, refer to the following detailed description in connection with the accompanying drawings.

DETAILED DESCRIPTION OF THE INVENTION

Figure 5:
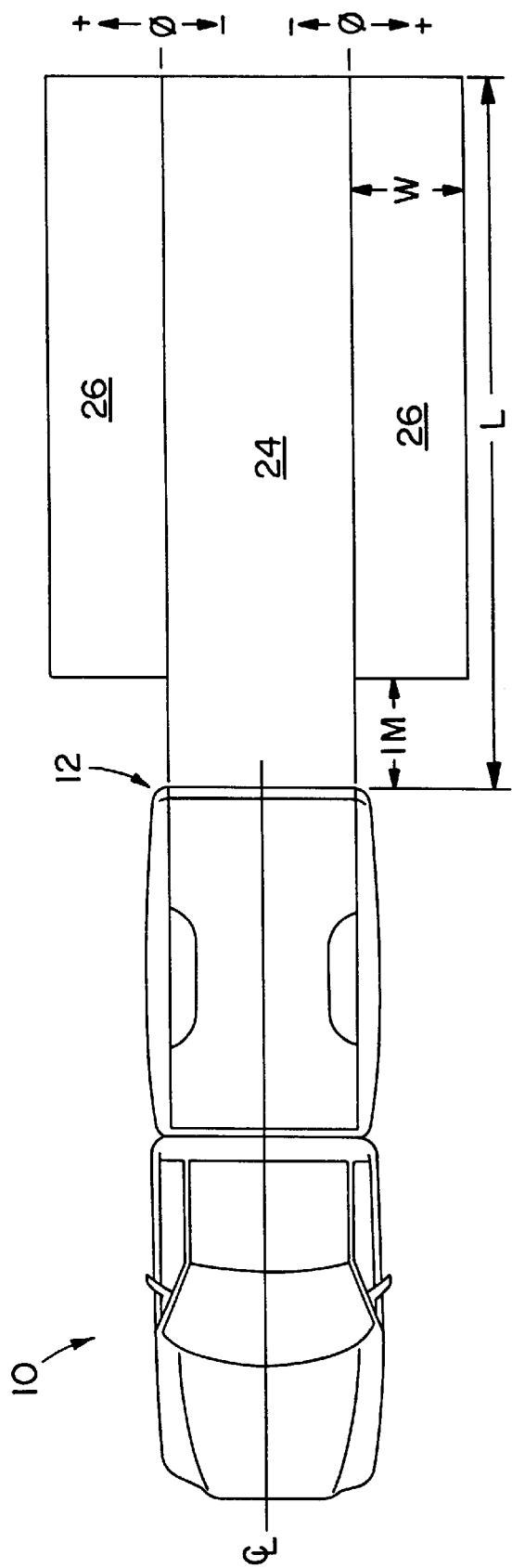
FIG. 5 is a top view of the target areas illuminated by the lighting device according to the present invention.

FIG. 5 illustrates a motor vehicle at 10. As illustrated motor vehicle 10 is a pick-up truck, but may comprise any motor vehicle including, but not limited to, passenger cars, sport utility vehicles, minivans, light trucks and sports cars. As shown, motor vehicle 10 includes a lighting device 12, and more preferably both left-hand and right-hand lighting devices located at the rearward outboard corners of the motor vehicle 10. However, lighting device 12 may be located in any quantity and in any location on the motor vehicle 10.

Figure 1:
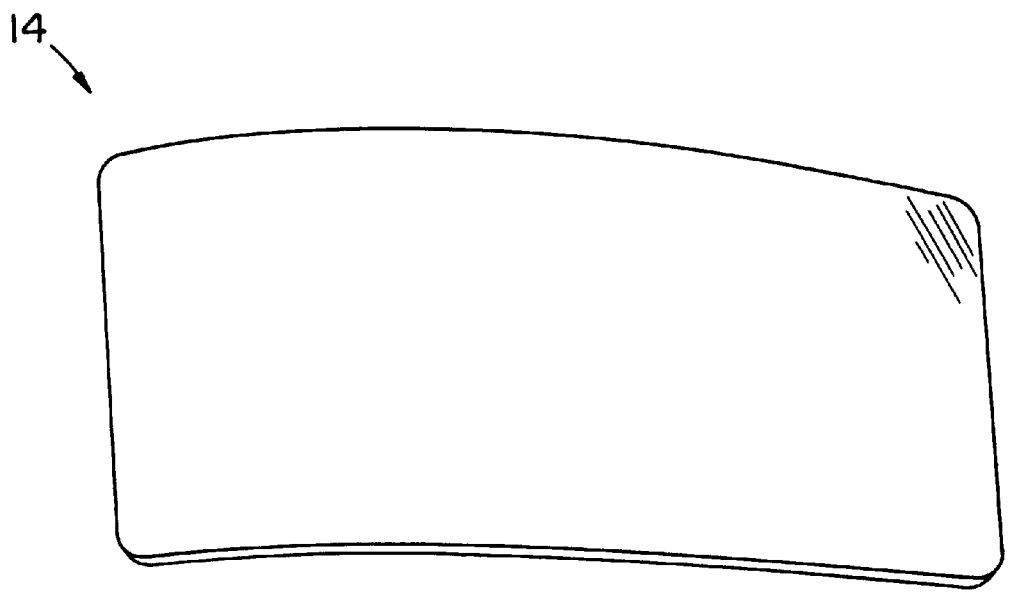
FIG. 1 is a representative perspective front view of the lens of the lighting device according to the present invention.
Figure 2:
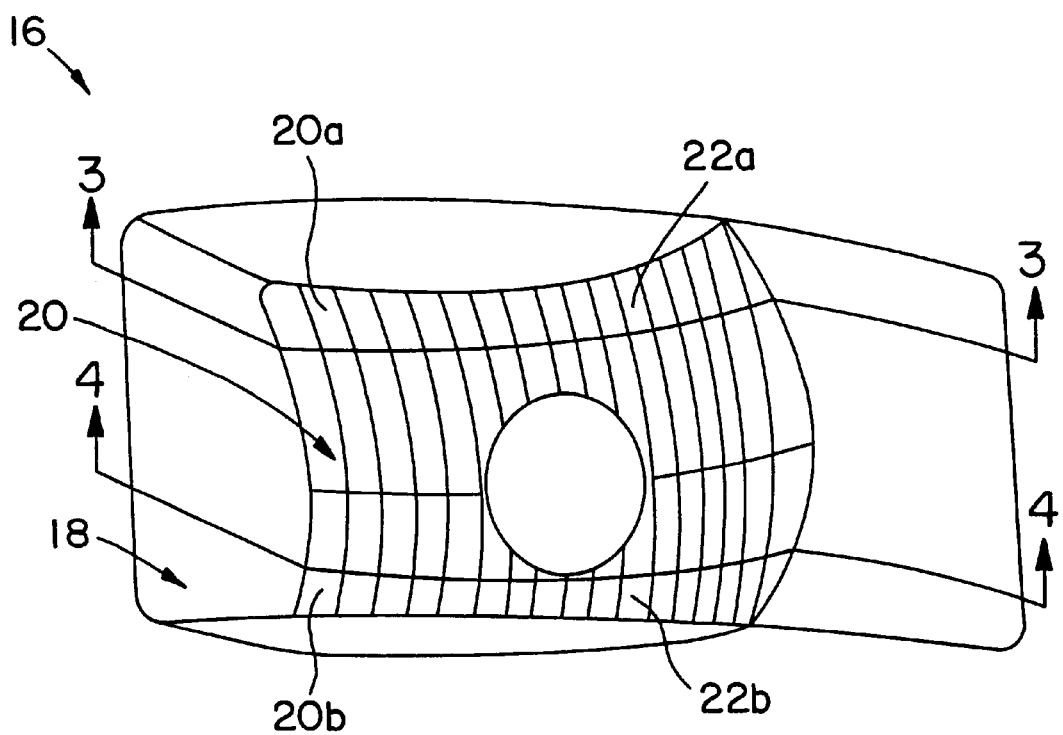
FIG. 2 is a representative perspective front view of the housing of the lighting device according to the present invention.

As shown in FIGS. 1–2, lighting device 12 preferably comprise a lens 14, a housing 16, and a light source (not shown) in the form of an incandescent bulb which is located within the confines of the lens 14 and housing 16 upon their assembly and is preferably activated when the motor vehicle 10 is placed in a reverse gear. Lens 14 is preferably made from thermoplastic, particularly acrylic, by injection molding. Housing 16 is also preferably made from a thermoplastic, particularly polycarbonate acrylonitrile-butadiene-styrene, by injection molding. However, those skilled in the art will appreciate that the lens may be prepared from any suitable transparent plastic material, and the housing may also be prepared from such materials, as will as those materials that provide a reflective coating.

Lens 14 and housing 16 are preferably connected along their peripheral edges in a manner known in the art. For example, lens 14 may include a tongue portion which is inserted into a mating groove portion on housing 16 containing a hot melt adhesive. Also for example, lens 14 and housing 16 may be connected by any number of suitable mechanical fastening devices (e.g. clips, screws, snap-tabs, etc.) or thermal joining techniques (i.e. where heat is applied to the interface prior to joining; e.g. ultrasonic welding, vibration welding, hot plate welding).

Housing 16 may comprise one or more compartments 18. As shown in FIG. 2, housing 16 has one compartment. Compartment 18 of housing 16 comprises a reflective portion 20 which is segmented into a ground illumination portion 20a and a reverse signaling portion 20b, with the ground illumination portion 20a constituting the upper portion and the reverse signaling portion 20b constituting the lower portion.

Ground illumination portion 20a of reflective portion 20 comprises a first reflective surface 22a which is configured to direct or aim light from the light source substantially towards or convergent on the ground surface. In this manner, lighting device 12 operates as ground illumination device. In other words, lighting device 12 illuminates the ground surface rearward or in back of vehicle 10 to aid the operator of vehicle 10 in guiding the vehicle 10 in reverse direction.

Reverse signaling portion 20b of reflective portion 20 comprises a second reflective surface 22b which is configured to direct or aim light from the light source to an area substantially different than the ground illumination portion (e.g. substantially away from or divergent from the ground surface). In this manner, lighting device 12 operates as a reverse signaling device. In other words, lighting device 12 alerts a pedestrian that vehicle 10 is about to back-up or engage reverse direction. Thus, lighting device 12 serves as both a reverse signaling device and ground illumination device simultaneously.

Figure 3:
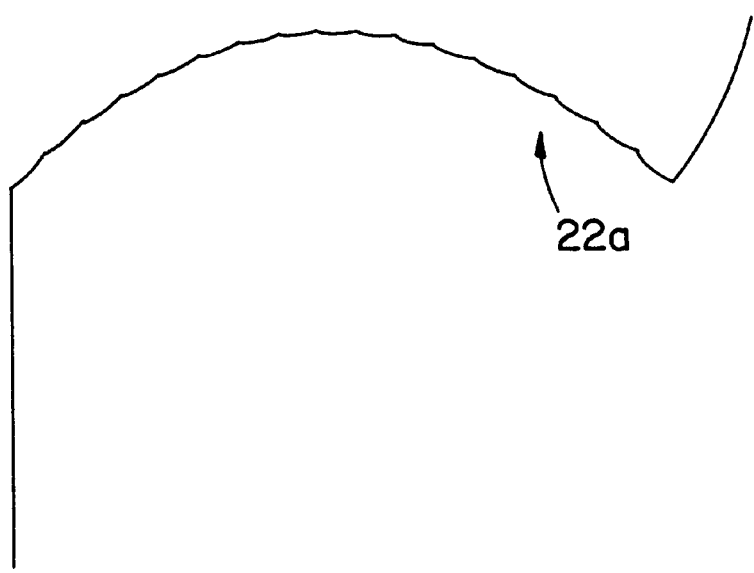
FIG. 3 is a cross-sectional view of the lighting device of FIG. 1 taken along line 3—3.
Figure 4:
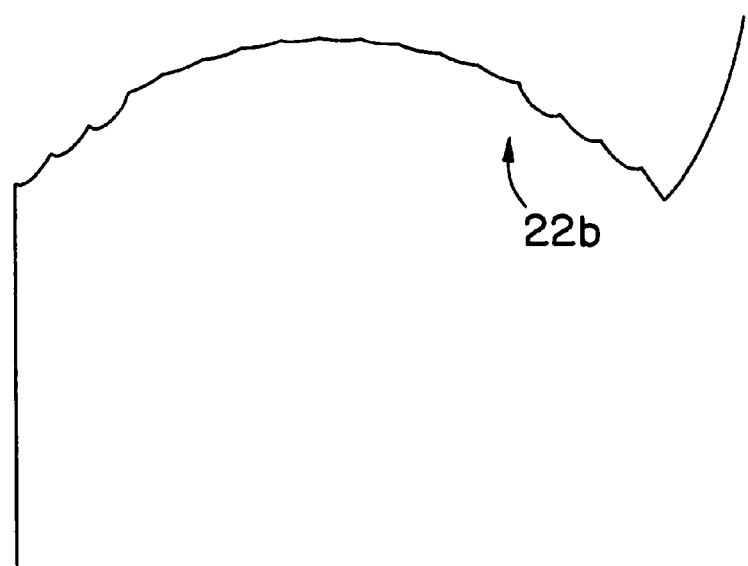
FIG. 4 is a cross-sectional view of the lighting device of FIG. 1 taken along line 4—4.

In order for first reflective surface 22a and second reflective surface 22b to be configured to direct or aim light to different locations, each of the surfaces preferably comprises a different profile. FIG. 3 illustrates a first cross-car (i.e. horizontal) cross-sectional view of housing 16 and, in particular, first reflective surface 22a. FIG. 4 illustrates a second cross-car cross-sectional view of housing 16 and, in particular, second reflective surface 22b. As can be seen from the comparison of the cross-sectional views of first reflective surface 22a with second reflective surface 22b, second reflective surface 22b has a different contour than first reflective surface 22a. While both contours exhibit a stepped surface along their cross-sectional lengths, the depths of the stepped surfaces are different. Consequently, the optical characteristics of the reflective surfaces 22a, 22b are different. In other words, first reflective surface 22 is configured to direct light substantially towards the ground surface while second reflective surface 22b is configured to direct light to an area substantially different than the ground illumination portion. In addition, although preferably, the surfaces are stepped, in accordance with the present invention, contouring is not necessarily limited to stepped surfaces, and other geometrical shapes may be employed to provide the desired reflection.

In order to develop a more "effective" lighting device 12, the preferred target area 26 is identified as shown in FIG. 5. Target area 26 is distinguished from the motor vehicle's blind spot area 24. Area 24 also identifies the rearward driving path of the motor vehicle when the motor vehicle is moving in a conventional reverse direction.

Target area 26 is generally defined by a rectangle which has a length L starting about 1 meter rearward and perpendicular to the rear of the motor vehicle 10 and ending at a distance equal to about the vehicle length measured from the rear of the vehicle. The width W of the rectangle defining target area 26 starts about at the inboard edge of lighting device 12 and extends outboard and perpendicular to the side of the motor vehicle 10 ending at a distance equal to about one-half the vehicle width. As used herein "inboard" and "outboard" are measured sideward relative to the front-to-rear centerline (CL) of vehicle 10. "Inboard" refers to a point or direction closer or towards the front-to-rear centerline (CL) of vehicle 10 while "outboard" refers to a point or direction farther or away from the front-to-rear centerline (CL) of vehicle 10.

While the above dimensions and resulting location are selected to represent the target area 26, more importantly the actual location of illumination from lighting device 12 is directed substantially into an area within an operator's eyesight, direct or indirect (e.g. reflected) as opposed to being directed substantially into the motor vehicle's blind spot area 24. In other words, the actual location of the target area 26 could be different as long as illumination from lighting device 12 is directed substantially into an area within an operator's eyesight. For example, the length L of the target area 26 may start flush with the rear of the motor vehicle 10 and extended rearward for at least the distance equal to or greater then the vehicle's length, while the width W of the target area 26 may extend outboard and perpendicular to the side of the motor vehicle 10 at a distance at least equal to or greater than one-half the vehicle width.

Figure 6:
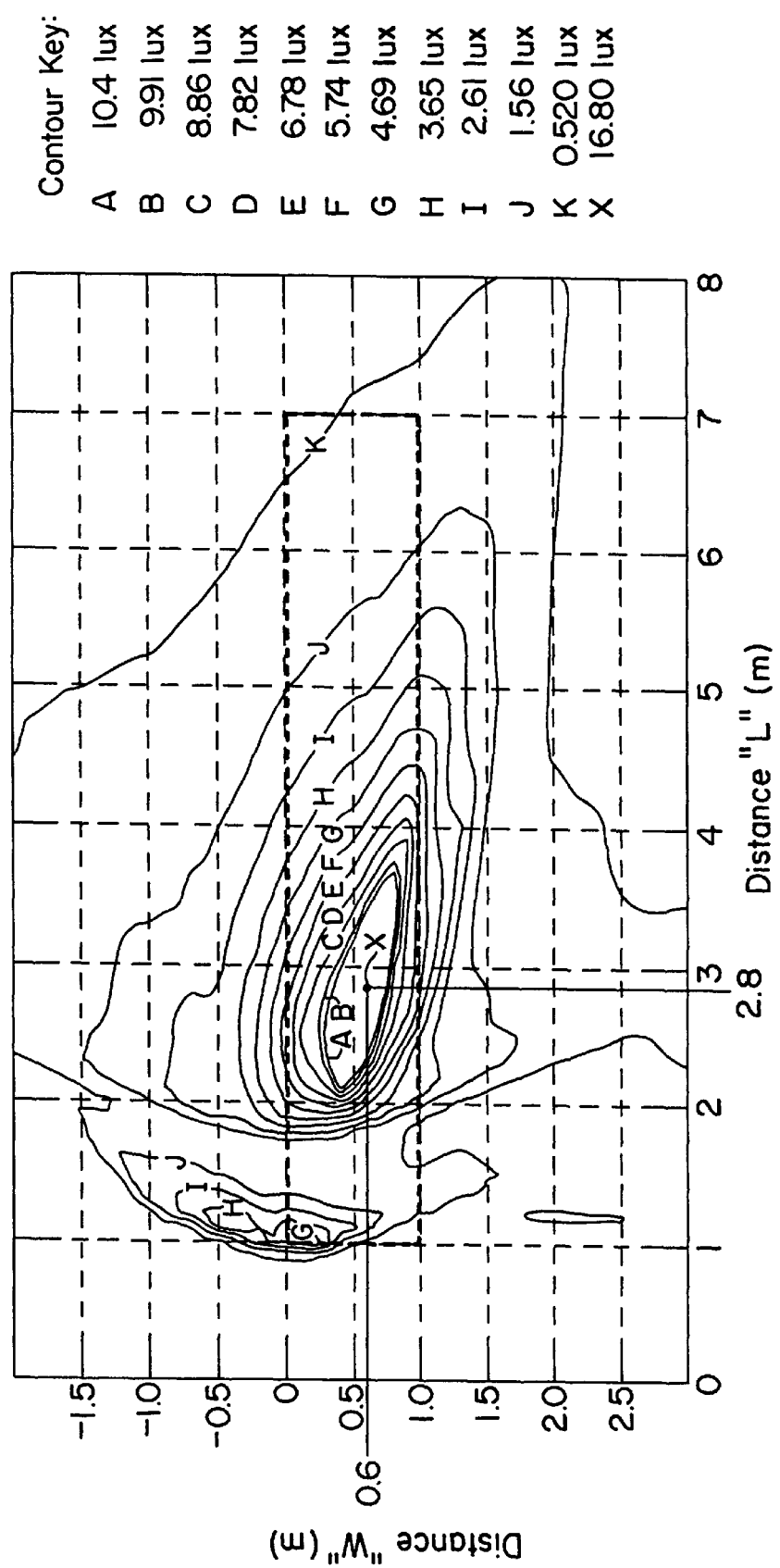
FIG. 6 is a contour plot of the light intensity distribution created by the lighting device of the present invention in a target area.

As shown in FIG. 6, which is a contour plot of light intensity distribution, preferred lighting device 12 provides a maximum luminous intensity X of 16.8 lux measured at the ground surface at a distance of about 2.8 meters from the rear of vehicle 10 and about 0.6 meters outboard from the inboard edge of lighting device 12. Furthermore, as depicted by the bold dotted rectangle, the maximum intensity was measured in the preferred target area 26 (i.e. the actual location of illumination from lighting device 12 is directed substantially into an area within an operator's eyesight, direct or indirect (e.g. reflected) as opposed to being directed substantially into the motor vehicle's blind spot area 24).

As can therefore be seen from the above, the maximum luminous intensity measured at the ground surface area is preferably at a distance between 1–7 meters from the rear of the vehicle, including 1 meter increments therein. In addition, the preferred lighting device provides a maximum luminous intensity between 0.5 to 3.0 meters outboard from the inboard edge of the lighting device, including 1 meter increments.

In instances where conventional reverse signaling devices provide some ground illumination, the luminous intensity measured at the ground surface is directed substantially into the motor vehicle's blind spot area 24. This is to be expected since as indicated above, conventional reverse signaling devices are not designed to illuminate the ground. Conversely, lighting device 12 of the present invention provides its maximum light intensity at a location enabling it to function as a ground illumination device for rearward driving, contrary to conventional reverse signaling devices.

In other embodiments, lens 14 may be segmented into a ground illumination portion and a reverse signaling portion. In such an instance, lens 14 may be segmented in combination with housing 16 such that both lens 14 and housing 16 comprise an upper ground illumination portion and a lower reverse signaling portion. In other embodiments, lens 14 may be segmented into a ground illumination portion and a reverse signaling portion while housing 16 is not be segmented into a ground illumination portion and a reverse signaling portion.

We intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims herein.

What is claimed is:

1. A motor vehicle lighting device comprising:

a light source configured to emit light;

a ground illumination portion configured to direct a portion of the light emitted from the light source to illuminate a ground surface area rearward from the motor vehicle, wherein the portion of the light emitted from the lighting device to illuminate a ground surface area rearward from a motor vehicle is further configured to illuminate rearward for at least the distance equal to or greater then the vehicle's length and perpendicular to the side of said motor vehicle at a distance at least equal to or greater than one-half the vehicle width; and a reverse signaling portion configured to direct a portion of the light emitted from the light source to an area different than the ground illumination portion.

2. The motor vehicle lighting device of claim 1, wherein said portion of the light emitted from the lighting device to illuminate a ground surface area rearward from said motor vehicle starts about 1 meter rearward from said motor vehicle and ends at a distance equal to about the vehicle length and extends perpendicular to the side of said motor vehicle ending at a distance equal to about one-half the vehicle width.

3. A motor vehicle lighting device comprising:

a light source configured to emit light;

a ground illumination portion configured to direct a portion of the light emitted from the light source to illuminate a ground surface area rearward from the motor vehicle, wherein said ground illumination device configured to direct a portion of said light source to illuminate a ground surface portion provides a maximum luminous intensity measured at a distance of about 1–7 meters from the rear of said vehicle and 0.5–3.0 meters perpendicular to said vehicle side; and a reverse signaling portion configured to direct a portion of the light emitted from the light source to an area different than the ground illumination portion.

4. The motor vehicle lighting device of claim 3, wherein said ground illumination device configured to direct a portion of said light source to illuminate a ground surface portion provides a maximum luminous intensity measured at a distance of about 2–5 meters from the rear of said vehicle and 0.5–1.0 meters perpendicular to said vehicle side.

5. The motor vehicle lighting device of claim 4, wherein said ground illumination device configured to direct a portion of said light source to illuminate a ground surface portion provides a maximum luminous intensity measured at a distance of about 2.0–3.0 meters from the rear of said vehicle and 0.5–1.0 meters perpendicular to said vehicle side.

* * * * *